(12) United States Patent
Mears et al.

(10) Patent No.: US 12,514,151 B2
(45) Date of Patent: *Jan. 6, 2026

(54) PHOTOELECTRIC SENSOR FOR SEED DISPENSING SYSTEM

(71) Applicant: TSI INCORPORATED, Shoreview, MN (US)

(72) Inventors: Barry C. Mears, Auburn, IL (US); Kyle T. Kalk, Chatham, IL (US)

(73) Assignee: TSI INCORPORATED, Shoreview, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,747

(22) Filed: Apr. 9, 2024

(65) Prior Publication Data

US 2024/0251699 A1 Aug. 1, 2024

Related U.S. Application Data

(63) Continuation of application No. 17/173,647, filed on Feb. 11, 2021, now Pat. No. 12,022,765.
(Continued)

(51) Int. Cl.
*A01C 7/10* (2006.01)
*A01B 79/00* (2006.01)
(Continued)

(52) U.S. Cl.
CPC ............ *A01C 7/105* (2013.01); *A01B 79/005* (2013.01); *A01C 7/16* (2013.01); *G01P 1/07* (2013.01); *G06M 1/101* (2013.01)

(58) Field of Classification Search
CPC .......... A01B 79/005; A01C 7/08; A01C 7/10; A01C 7/102; A01C 7/105; A01C 7/16;
(Continued)

(56) References Cited

U.S. PATENT DOCUMENTS

| | | |
|---|---|---|
| 4,166,948 A | 9/1979 | Steffen |
| 4,555,624 A | 11/1985 | Steffen |

(Continued)

FOREIGN PATENT DOCUMENTS

| | | |
|---|---|---|
| BR | 112014007278 B1 | 11/2018 |
| BR | 112015001540 B1 | 2/2020 |

(Continued)

OTHER PUBLICATIONS

International Search Report dated Apr. 29, 2021 for International Patent Application No. PCT/US2021/017672 (2 pages).
(Continued)

*Primary Examiner* — Georgia Y Epps
(74) *Attorney, Agent, or Firm* — Smith, Gambrell & Russell, LLP.

(57) ABSTRACT

A seed dispensing system is provided with a photoelectric sensor for monitoring the dispensing of seeds from a seed dispenser comprising a discharge conveyor with conveyor flights that transport seeds through the seed dispenser. The sensor outputs a signal representative of obstructions to the flow of light in an optical path of the sensor, and a computing unit is adapted to distinguish portions of the output signal that are attributable to the passage of one or more seeds from portions of the output signal that are attributable to the passage of a conveyor flight.

13 Claims, 8 Drawing Sheets

Related U.S. Application Data

(60) Provisional application No. 62/972,868, filed on Feb. 11, 2020.

(51) Int. Cl.
*A01C 7/16* (2006.01)
*G01P 1/07* (2006.01)
*G06M 1/10* (2006.01)

(58) Field of Classification Search
CPC ........ A01C 7/163; A01C 7/166; G01N 21/00; G01P 1/07; G06M 1/101; H01L 31/00
See application file for complete search history.

(56) References Cited

U.S. PATENT DOCUMENTS

| | | | |
|---|---|---|---|
| 4,635,215 | A | 1/1987 | Friend |
| 5,635,911 | A | 6/1997 | Landers et al. |
| 7,086,269 | B2 | 8/2006 | Sauder et al. |
| 9,888,623 | B2 | 2/2018 | Tevs et al. |
| 10,757,856 | B2 | 9/2020 | Körösi et al. |
| 12,022,765 | B2 * | 7/2024 | Mears ............... A01C 7/20 |
| 2007/0039528 | A1 | 2/2007 | Sauder et al. |
| 2010/0192821 | A1 | 8/2010 | Garner et al. |
| 2011/0217722 | A1 | 9/2011 | Durack et al. |
| 2012/0240838 | A1 | 9/2012 | Garner et al. |
| 2015/0201549 | A1 | 7/2015 | Baurer et al. |
| 2016/0374263 | A1 | 12/2016 | Steffen et al. |
| 2019/0219606 | A1 | 7/2019 | Radtke et al. |
| 2021/0243942 | A1 | 8/2021 | Mears et al. |
| 2024/0251699 | A1 * | 8/2024 | Mears ............... G01P 1/07 |

FOREIGN PATENT DOCUMENTS

| | | |
|---|---|---|
| BR | 112016004333 B1 | 5/2020 |
| BR | 112020006264 A2 | 10/2020 |
| CN | 106922262 A | 7/2017 |
| CN | 107087462 A | 8/2017 |
| WO | 2013/049198 A1 | 4/2013 |
| WO | 2014/018717 A1 | 1/2014 |
| WO | 2015/031840 A1 | 3/2015 |
| WO | 2019/067933 A1 | 4/2019 |

OTHER PUBLICATIONS

Written Opinion dated Apr. 29, 2021 for International Patent Application No. PCT/US2021/017672 (6 pages).

Extended European Search Report mailed Feb. 6, 2024 for European Patent Application No. 21754509.4 (8 pages).

Office Action mailed Apr. 30, 2024 relative to Brazilian Patent Application No. BR 11 2022 015886 6 (11 pages in Portuguese; pages English translation).

Notice of Rejection dated Jul. 31, 2024 for Korean Patent Application No. 10-2022-7030773 (3 page in Korean; 3 page English translation).

Decision for Grant of Patent dated Feb. 3, 2025 Korean Patent Application No. 10-2022-7030773 (5 page in Korean; 1 page English translation).

* cited by examiner

PHOTOELECTRIC SENSOR FOR SEED DISPENSING SYSTEM

FIELD OF THE INVENTION

The present invention relates to systems and methods for seed planting, and particularly a photoelectric sensor for use in monitoring and counting seeds dispensed during crop planting.

BACKGROUND OF THE INVENTION

Conventional seeding systems include a seed dispenser 100 that includes at least one hopper 101 that conveys seeds to at least one discharge tube 102 aligned along a width of the system for dispersing seeds in a crop field. An example of a seed dispenser 100, as shown in FIG. 1, is inclusive of a discharge tube 102 having a vertically oriented passage 104 along which seeds 10 freely drop or slide from an inlet 106 to an outlet 108 under the force of gravity. In operation, a seeding system will use multiple discharge tubes 102 for independently feeding seeds to respective crop furrows as the seeding system moves along a field.

Ideally, so as to achieve a uniform spacing of seeds for optimizing crop density, seed dispensers discharge individual seeds, one at a time, with predetermined spacing between each successive seed. However, conventional systems rarely achieve ideal results as there are often instances where successive seeds are dispersed with too little or too great a spacing therebetween. Therefore, in the interest of promoting more uniform seed dispersal, seeding systems are often provided with means for monitoring seed dispensing so as to count the number of seeds discharged, and/or tracking the spacing between individually discharged seeds.

Photoelectric sensors have been used in the past to monitor seed dispensing through discharge tubes based on light signals. Examples of such sensors have been disclosed by Steffen (U.S. Pat. No. 4,166,948) and Steffen (U.S. Pat. No. 4,555,624). These sensors typically include a light source, such as a light emitting diode (LED), positioned to one side of the discharge tube and a light responsive element, such as a photo-responsive diode or photovoltaic cell, positioned at the opposite side of the discharge tube. In operation, the light source outputs a light and the light responsive element produces a signal in response to a level of light incident thereupon. Normally, the light source outputs a constant light and the light responsive element produces a steady state signal. When a seed passes through the discharge tube, and through the optical path that extends between the light source and the light responsive element, the seed obstructs the light along the optical path, casting a shadow upon the light responsive element, thereby decreasing the level of light incident upon the light responsive element, which in turn results in a change to the signal produced by the light responsive element. Seed discharge count and spacing is then determined from changes in an output signal produced by the light responsive element.

Recent innovations to seeding systems replace traditional gravity drop discharge tubes with discharge conveyors. One example of a discharge conveyor is disclosed by Radtke, et al. (US 2019/0219606). While photoelectric sensors have proven effective in seed dispensers that employ a traditional gravity drop discharge tube, they have to date been unsuitable for use in seed dispensers that include a discharge conveyor.

Accordingly, there remains a need in the art for a photoelectric monitoring device that can reliably monitor and count seeds in a seed dispenser that employs a discharge conveyor.

SUMMARY OF THE INVENTION

The present invention is inclusive of a device for monitoring the dispensing of seeds, the device including a photoelectric sensor having a light-emitting element and a light-responsive element for detecting changes in a light flow through an optical path between the light-emitting element and a light-responsive element, and for outputting a signal conveying detected changes in the light flow. A computing device is provided for receiving and processing signal waveforms based on the output signal of the photoelectric sensor to measure one or more parameters of the signal waveform, and to distinguish portions of the signal waveform useful for seed counting based on the one or more measured parameters of the signal waveform.

Signal conditioning circuitry is provided for conditioning the output signal of the photoelectric sensor to generate a pulse signal waveform in which pulses generated from the passage of a conveyor flight are maintained with uniform amplitude and stable baseline which serve as the signal reference which is necessary for consistent determination of characteristics of seed pulses such as peak period, width and area. A digital proportional-integral control loop is used for controlling the intensity of the light-emitting element of the photoelectric sensor for maintaining pulses generated from the passage of a conveyor flight within a predetermined intensity range, and an additional analog gain adjustment control loop is used to boost the processed pulse amplitudes in the event the proportional-integral loop is unable to maintain conveyor flight pulses within the predetermined range.

The computing device is adapted to receive signal waveforms in the form of pulse signal waveforms, and is further adapted to measure, as the one or more parameters, at least one of: a pulse peak; a pulse period; a pulse width; and a pulse area. The computing device uses the one or more measured parameters to distinguish portions of the signal waveform that are attributable to disturbances in the light flow based on the passage of one or more seeds through the optical path of the photoelectric sensor from portions of the signal waveform that are attributable to disturbances in the light flow based on the passage of non-seed elements, and particularly the passage of seed conveyor flights. The computing unit is further adapted to distinguish between pulses generated from the passage of a single seed and pulses generated from the concurrent passage of multiple seeds. The computing device uses one or more predetermined threshold values for the one or more measured parameters for distinguishing pulses in the pulse signal waveform, and is adapted to adjust measured parameter values to account for bias errors in pulses that are determined to correspond to the concurrent passage of a conveyor flight and one or more seeds.

The present invention is further inclusive of seeding systems that include a seed dispenser and a seed dispensing monitoring device, including seed dispensers that are inclusive of a conveyor having an endless belt with a plurality of flights therealong for capturing and conveying seeds through a passage of the seed dispenser.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
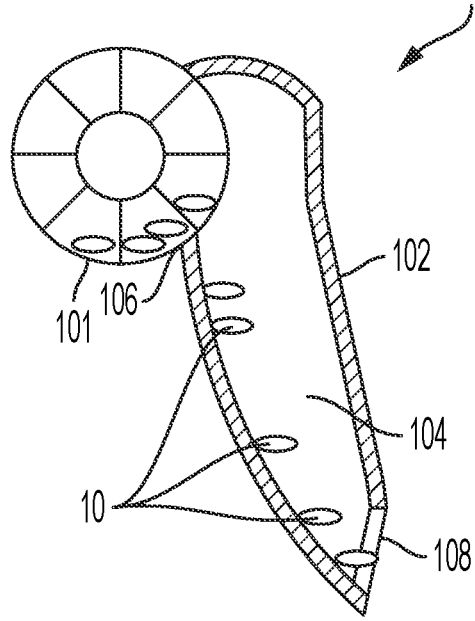
FIG. 1 shows a conventional seed dispenser.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx.+/−10%; in other instances there may be encompassed values in a range of approx.+/−5%; in yet other instances values in a range of approx.+/−2% may be encompassed; and in yet further instances, this may encompass values in a range of approx.+/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

A conventional seed dispenser 100, with a discharge tube 102, as shown in FIG. 1, provides a vertically oriented passage 104 along which seeds 10 freely drop or slide from an inlet 106 to an outlet 108 under the force of gravity, with the seeds 10 being the only object passing therethrough. Thus, in a conventional discharge tube 102, any obstruction detected in the flow of light in an optical path of a sensor may reliably be attributed to the passage of a seed 10.

Figure 2:
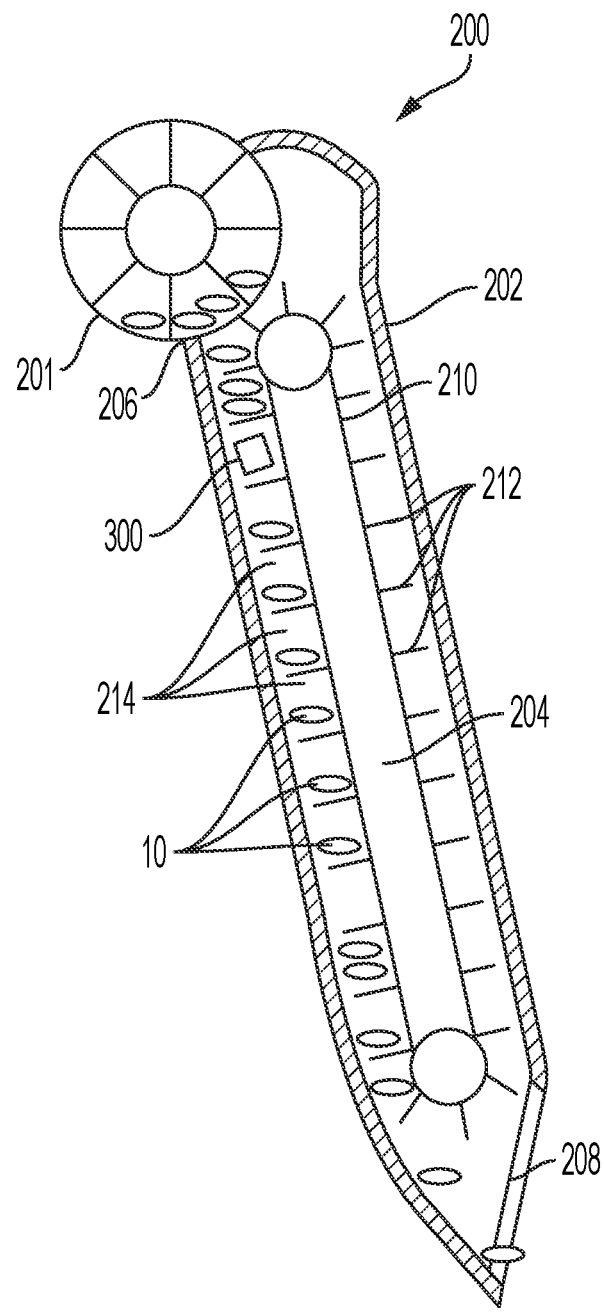
FIG. 2 shows a seed dispenser according to the present invention.

However, in an advanced seed dispenser 200, with a discharge conveyor 202, such as that shown in FIG. 2, there is provided an endless belt 210 extending through the passage 204, with the belt 210 having a number of flights 212 therealong. In operation, a hopper 201 feeds seeds 10 into an inlet 206 where the seeds 10 are then captured in spaces 214 between successive flights 212, and the seeds 10 are then carried by the flights 212 toward an outlet 208, at which point the seeds 10 are released to drop through the outlet 208. In an ideal operation, a single seed 10 will be captured in the space 214 between successive pairs of flights 212, with successive seeds separated by a consistent number of empty flights with no seed between them thereby feeding seeds with uniform spacing and enabling a reliable count of seeds dispensed based on the speed of the belt 210 and the spacing the flights 212. However, in practice, the system will occasionally deviate from ideal operation, for example, when a seed 10 is not captured in the appropriate space 214, or when two or more seeds 10 are captured in a single space 214. Therefore, to monitor and count the dispensing of seeds, the seed dispenser 200 is provided with a photoelectric sensor 300.

Figure 3:
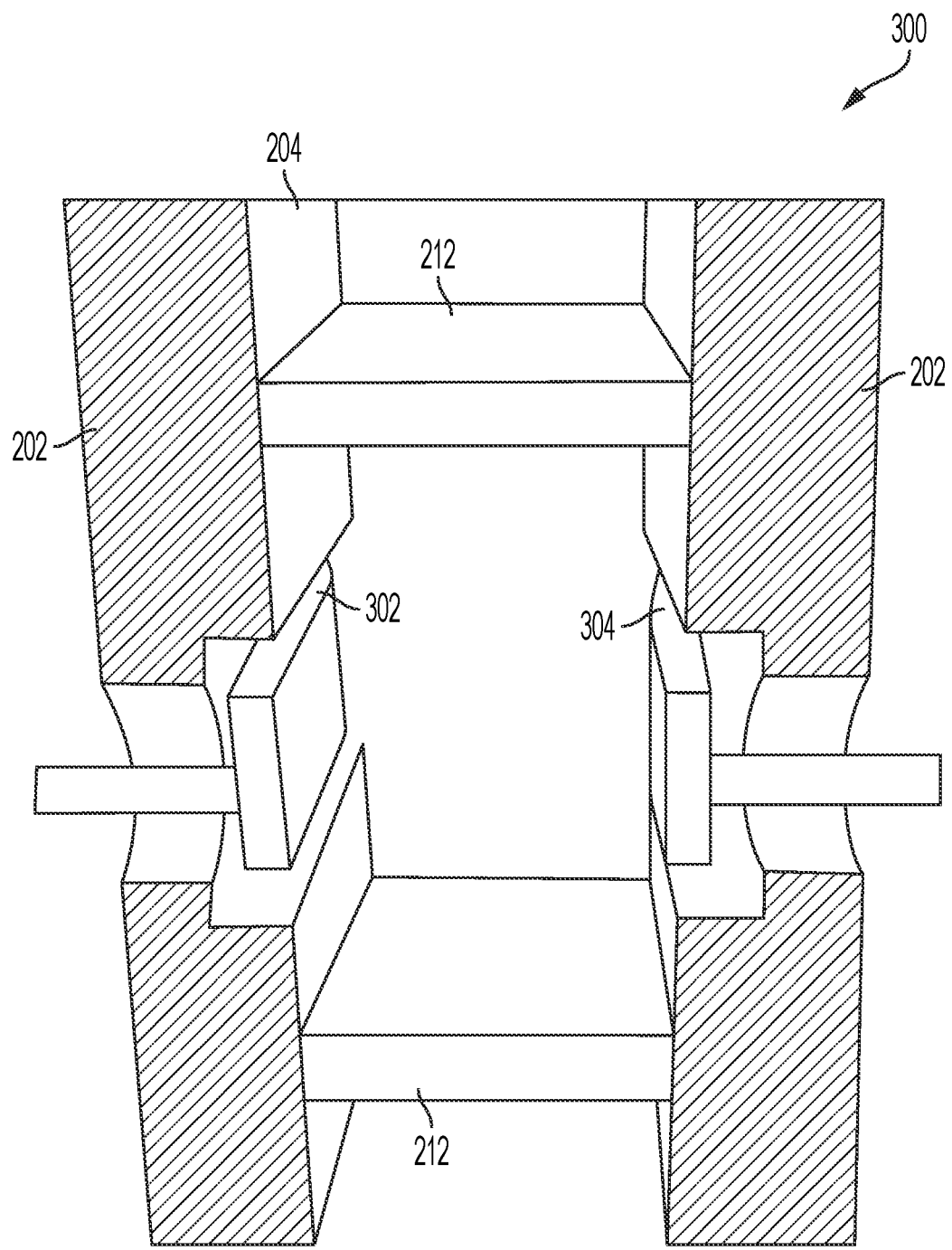
FIG. 3 shows a seed sensor of the seed dispenser in FIG. 2.

In one example, as shown in FIG. 3, the sensor 300 includes a light source 302, such as a light emitting diode (LED), positioned to one side of the passage 204 and a light responsive element 304, such as a photo-responsive diode or photovoltaic cell, positioned at the opposite side of the passage 204. The light source 302 outputs a light and the light responsive element 304 produces a signal in response to a level of light incident thereupon. When the light source 302 outputs a constant light, and when there is not any obstruction in the path of the light, the light responsive element 304 produces a steady state signal having a base intensity. When an obstruction passes through an optical path between the light source 302 and the light responsive element 304, thereby obstructing the incidence of light upon the light responsive element 304, the light responsive element 304 then produces a modified signal, having an intensity corresponding to the obstructed flow of light.

A complication arises in the operation of the sensor 300 in a seed dispenser 200 having a seed conveyor 202 in that, in addition to the seeds 10, the belt flights 212 will also obstruct the flow of light in the optical path, thereby presenting uncertainty as to whether changes in the signal output from the light responsive element 304 are representative of a seed 10, a flight 212, or a combination thereof. Systems according to the present invention addresses this through the generation of output signals such as those shown in FIGS. 4a/4b, both of which are examples of signal waveforms output from a sensor 300 during seeding operation in which soybeans were dispensed with a seeding population of 135k per acre while the system was travelling at speeds (ground speeds) of 8.5 MPH (FIG. 4a) and 5 MPH (FIG. 4b). In these examples, time is shown along the horizontal axis, as measured in microcontroller 20 kHz clock ticks, for 4000 ticks (e.g., 200 ms); and signal pulses output by the light responsive element 304 are shown along the vertical axis, as expressed in analog-to-digital converted (ADC) counts.

Figure 4A:
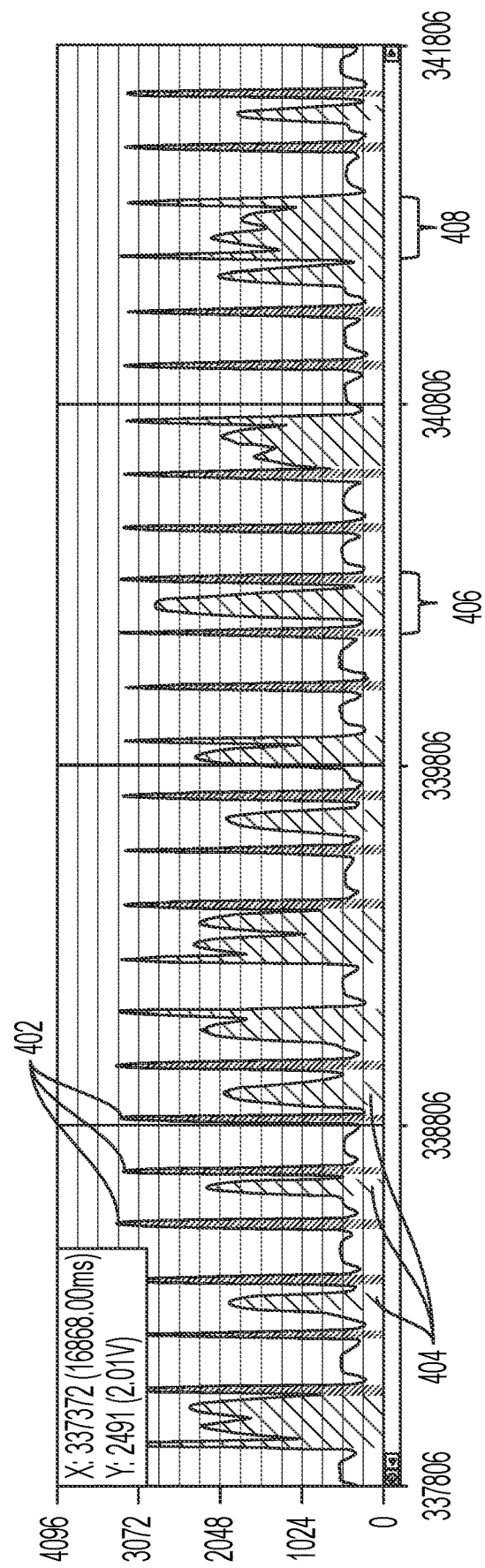
FIGS. 4*a*-4*b* show signal waveforms output by the sensor in FIG. 3.
Figure 4B:
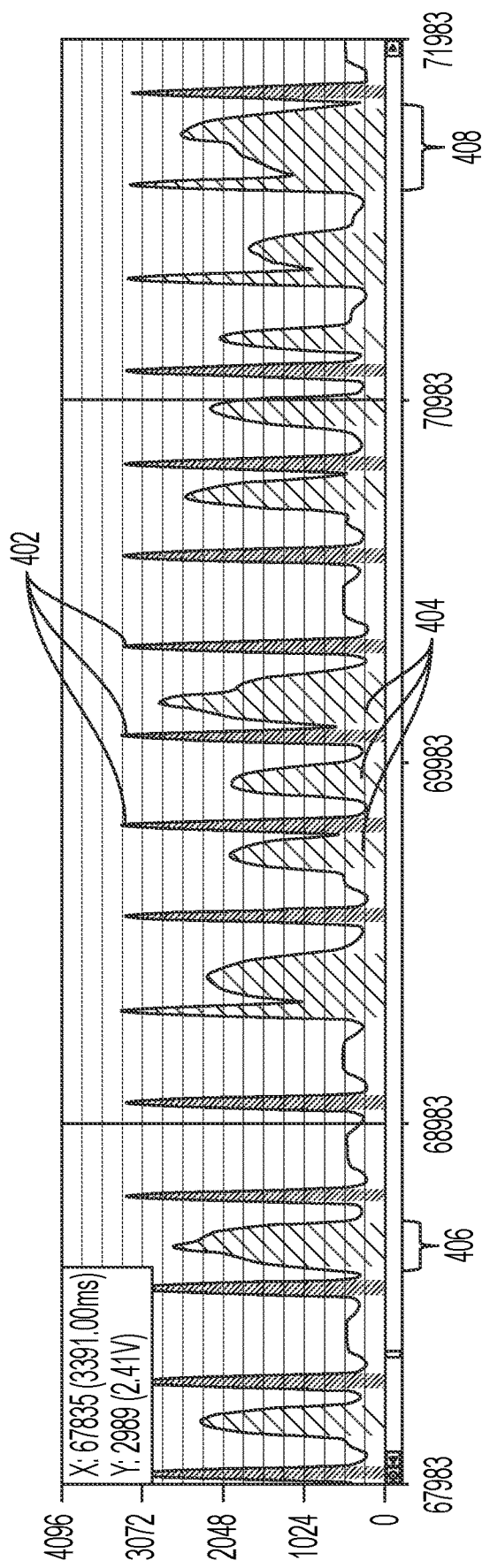

In both signal waveforms shown in FIGS. 4a/4b pulses 402 observed with highly uniform frequency and ADC count are attributed to the passage of belt flights 212 through the optical path between the sensor optics 302/304, whereas pulses 404 observed with greater variance in both frequency and ADC count are attributed to the passage of seeds 10. In these examples, flight pulses 402 are observed to have a peak ADC count in a range, on average, of about 3072 to about 3328 ($\sim$3072$\leq$x$\leq$$\sim$3328 ADC), whereas seed pulses 404 are observed to have a peak ADC count in a range, on average, of about 1536 to about 3072 ($\sim$1536$\leq$x$\leq$$\sim$3072 ADC). It will be understood, however, that the ADC values may vary based, for example, on the configuration of the belt and flights, the seed type, and the conditioning performed on the output signal.

In the examples shown in FIGS. 4a/4b, flight pulses 402 are observed to occur at a relatively uniform frequency, with seed pulses 404 occurring between successive flight pulses 402. It can be seen that some seed pulses 404 may have a single peak, while others have multiple peaks. The presence of a single peak in a seed pulse 404 (e.g., region 406) is indicative of a single seed 10 having been captured in a space 214 between two successive belt flights 212, whereas the presence of multiple peaks in a seed pulse 404 (e.g., region 408) is indicative of multiple seeds 10 having been captured in a space 214.

Upon comparing FIGS. 4a-4b it can be seen that the two signal waveforms differ in pulse frequency, with the signal in FIG. 4a (hereafter the MPH85 signal) characterized by a flight pulse 402 frequency of approximately 6-7 pulses per 1000 ticks (e.g., $\sim$6-7 pulses per 50 µs), and the signal waveform in FIG. 4b (hereafter the MPH50 signal) characterized by a flight pulse 402 frequency of approximately 4 pulses per 1000 ticks (e.g., $\sim$4 pulses per 50 ms). The difference in pulse frequency between the MPH85 and MPH50 signals is due to the seeding system travelling at different ground speeds in the two examples (8.5 MPH for the MPH85 signal, and 5 MPH for the MPH50 signal), while continuing to operate under a common seeding population of 135k per acre in both examples. To achieve a common seeding population, regardless of changes in travelling speed, the system is adapted to adjust drive of the endless belt 210 in the discharge conveyor 202 to a speed (belt rotation speed) that is proportional to the travelling speed (ground speed) of the seeding system. As a result, in comparison to the MPH85 signal, the MPH50 signal reflects an operational state of the seeding system during which the endless belt 210 is driven at a relatively slower speed, proportional to the slower travelling speed of the system, thereby resulting in the belt flights 212 passing through the optical path of the sensor 300 at a lower frequency.

As would be expected, when the endless belt 210 is driven at a slower speed, based on a slower travelling speed of the seeding system, belt flights 212 and seeds 10 will obstruct the optical path of the sensor 300 for a longer period of time, thereby resulting in an output signal with wider pulses. So that a count of dispensed seeds may be more reliably obtained, regardless of changes to the system travelling speed, it is preferable that the output signal be normalized to a uniform condition. Thus, in the examples of FIGS. 4a-4b, the signal waveforms are normalized by scaling the time axis by the inverse of the flight period (i.e., the time between two successive flights). The chosen normalization is applied to all time measurements used by the sensor 300, which includes pulse width, period, and area. Pulse amplitudes may also be normalized by dividing by the pulse amplitudes by the average amplitude of the flight pulses 402, with such normalization applied to the pulse peak and area measurements. Normalized parameters are denoted as scaled peak, scaled period, scaled width, and scaled area.

Figure 5:
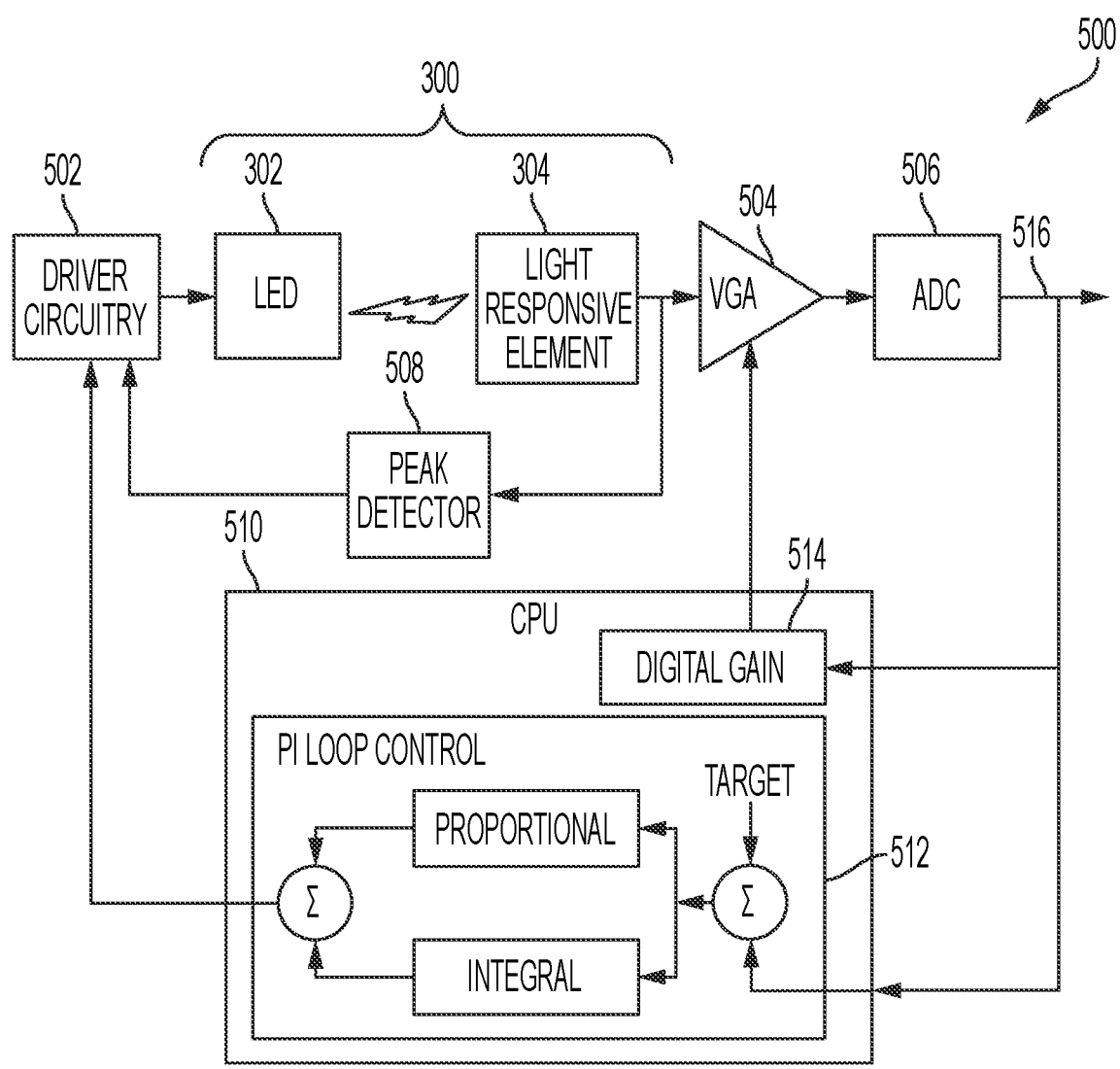
FIG. 5 shows signal conditioning circuitry for the sensor in FIG. 3.

FIG. 5 provides one example of signal conditioning circuitry 500 that may be used in systems according to the present invention, which is inclusive of driver circuitry 502 for driving the LED 302 of the sensor 300; the light responsive element 304 for generating an output signal based on light incident from the LED 302; a variable gain amplifier (VGA) 504 for receiving and amplifying an output signal of a light responsive element 304; and an analog-digital converter (ADC) 506 for converting the amplified analog output signal to a digital signal.

A peak detector 508 communicating with an output of the light responsive element 304 to provide a control loop to the driver circuitry 502 for controlling the electrical reference signal used to suppress a baseline of the output signal at a constant level, preferably in a range, on average, of about 256 to about 512 ($\sim$256$\leq$x$\leq$$\sim$512 ADC), as seen in FIGS. 4a-4b. A central processing unit (CPU) 510 is further provided with a proportional-integral (PI) loop 512 that is in communication with an output of the ADC 506 for providing a PI control loop to the driver circuitry 502 for controlling an intensity of the LED 302 such that peaks of flight pulses 402 are maintained at a "TARGET" ADC count, in this instance around 3328 ADS counts, and preferably in a range, on average, of about 3072 to about 3328 ($\sim$3072$\leq$x$\leq$$\sim$3328 ADC), as seen in FIGS. 4a-4b. Together, the PI control loop 512 and the peak detector 508 provide a dual amplitude control loop that standardizes an output signal of the sensor 300 so as to enable consistent measurements of pulse amplitude and area.

A digital gain 514 provided in CPU 510, and in communication with an output of the ADC 506, controls the VGA 504 to amplify the output signal of the sensor 300 when the PI control loop 512 is unable to maintain the "TARGET" ADC count. Together, the VGA 504 and digital gain 514 provide a gain control that adjusts the output signal to have an extended dynamic range sufficient to ensure the sensor 300 remains functionally operable even in circumstances where there is a 99% light blockage in the optical path (e.g., due to dust). As seen in the examples shown in FIGS. 4a-4b, the gain control adjusts the output signals such that peaks of flight pulses 404 maintain a uniform level, on average, of about 3072 to about 3328 (~3072≤x≤~3328 ADC).

In the example shown in FIG. 5, the PI loop control 512 and the digital gain 514 are both provided as software loops, while the peak detector 508 is provided as a hardware loop. It will be understood however that these components may be provided as either hardware or software loops.

To accurately count the number of seeds 10 dispensed, the system processes the conditioned output signals from the sensor 300 to distinguish seed pulses 404 from flight pulses 402, and to determine the number of seeds in each pulse 404, while ignoring the flight pulses 402. The system may distinguish seed pulses 404 from flight pulses 402 based on normalized parameters such as, for example: scaled pulse peak value; scaled flight period; scaled pulse width; and adjusted pulse area.

Figure 6:
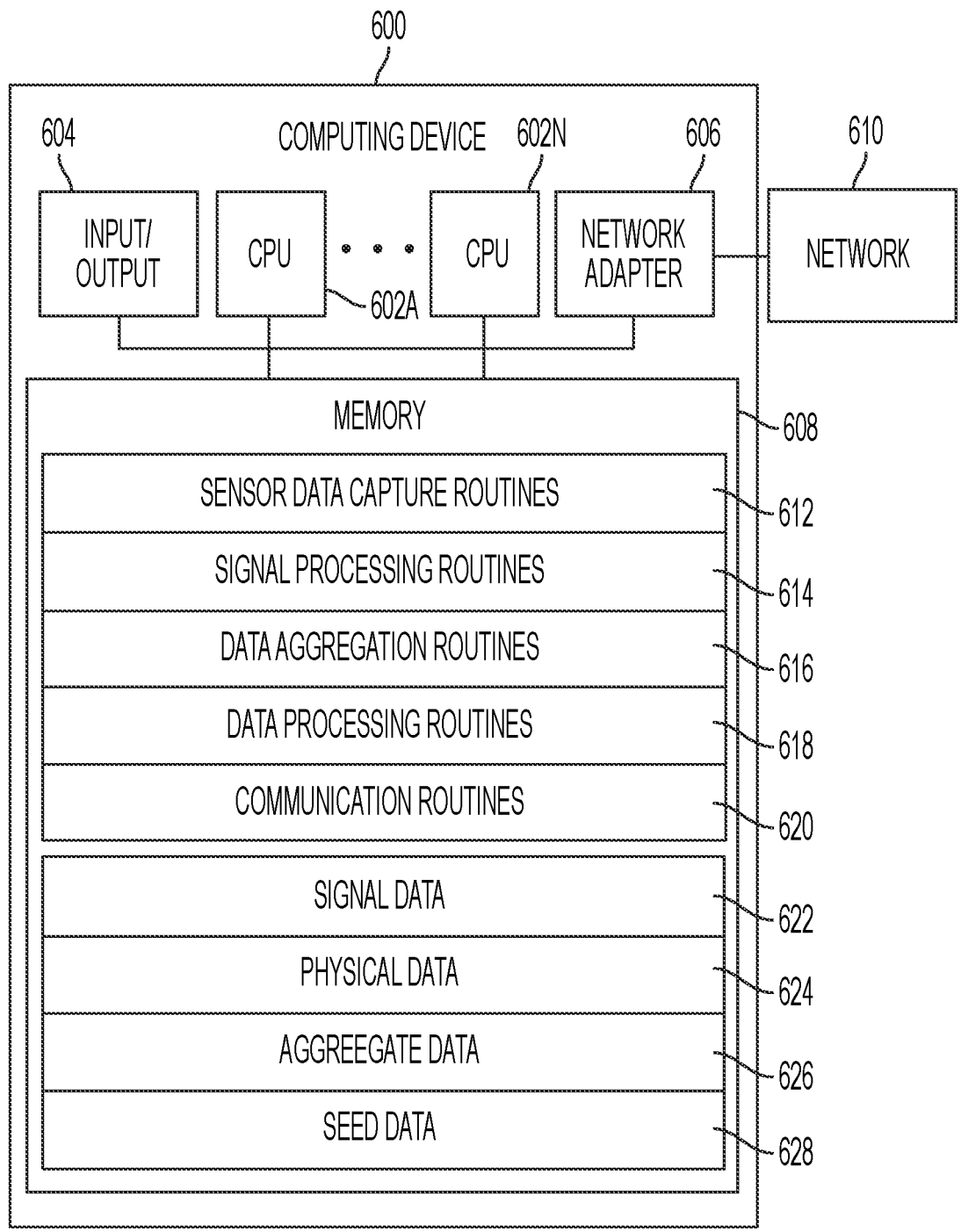
FIG. 6 shows a computing device for the sensor in FIG. 3.

FIG. 6 provides an exemplary block diagram for of a computing device 600 that may be used for assessing the normalized parameters of a conditioned signal that is output from the ADC 506 via an output 516 (FIG. 5). The computing device 600 is typically a programmed general-purpose computer system, such as an embedded processor, system on a chip, personal computer, workstation, server system, and minicomputer or mainframe computer, and may include one or more processors (CPUs) 602A-602N, input/output circuitry 604, an optional network adapter 606, and memory 608. CPUs 602A-602N execute program instructions in order to carry out the functions of the present invention. Typically, CPUs 602A-602N are one or more microprocessors, microcontrollers, processor in a System-on-chip, etc. FIG. 6 illustrates an embodiment in which computing device 600 is implemented as a single multi-processor computer system, in which multiple processors 602A-602N share system resources, such as memory 608, input/output circuitry 604, and network adapter 606.

Input/output circuitry 604 provides the capability to input data to, or output data from, computing device 600. For example, input/output circuitry 604 includes an input for receiving a conditioned signal from the signal conditioning circuitry 500, and may further include one or more user input devices, such as microphones, keyboards, mice, touch-pads, trackballs, etc., to enable a user to make changes to prestored data and or settings in the system (e.g., changing default settings to adjust threshold values based on a particular seed type for use in a seeding campaign). The input/output circuitry 604 further includes an output, such as a CAN bus, for communicating with a count display, as well as an electrical output that toggles based on a number of seeds detected in a conditioned signal waveform, and may further include user communication outputs such as speakers, video adapters, monitors, printers, etc. An optional network adapter 606 may interface computing device 600 with a network 610 that may be any public or proprietary LAN or WAN, including, but not limited to the Internet. When provided, the network adapter 606 may provide a means for linking the seed dispenser 200 to the internet-of-things so as to enable real-time communication of seed count from a seeding system employing the seed dispenser 200 to a central facility that may oversee seeding operations.

Memory 608 stores program instructions that are executed by, and data that are used and processed by, CPU 602 to perform the functions of computing device 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

In the example shown in FIG. 6, memory 608 may include sensor data capture routines 612, signal processing routines 614, data aggregation routines 616, data processing routines 618, signal data 622, physical data 624, aggregate data 626, and seed data 628. For example, sensor data capture routines 612 may include routines to receive and process conditioned signals waveforms from circuitry 500 to form signal data 622. Signal processing routines 614 may include routines to process signal data 620 to form physical data 624. Data aggregation routines 616 may include routines to process physical data 624 to generate aggregate data 626. Data processing routines 618 may include routines to process physical data 624, aggregate data 626, and/or seed data 628.

Though the examples illustrated in FIGS. 5 and 6 show the signal conditioning circuitry 500 using a CPU 510 for signal conditioning, and then outputting a conditioned signal to the computing device 600 for signal computing, it will be understood that CPU 510 and computing device 600 may instead be integrated into a single computing unit.

After following signal computing of the conditioned signal waveforms, the system may then distinguish seed pulses 404 from flight pulses 402 based on the normalized parameters. In one example, when identifying pulse type based on scaled pulse width, multiple pulse widths may be measured for each pulse—including a first base width ($W_b$) at or near to the pulse base; and a second peak width ($W_p$ or $W_{85}$) at approximately 85% of the pulse peak. $W_{85}$ can be used to assist in identifying situations where pulses are generated by seeds and flight, together.

Figure 7:
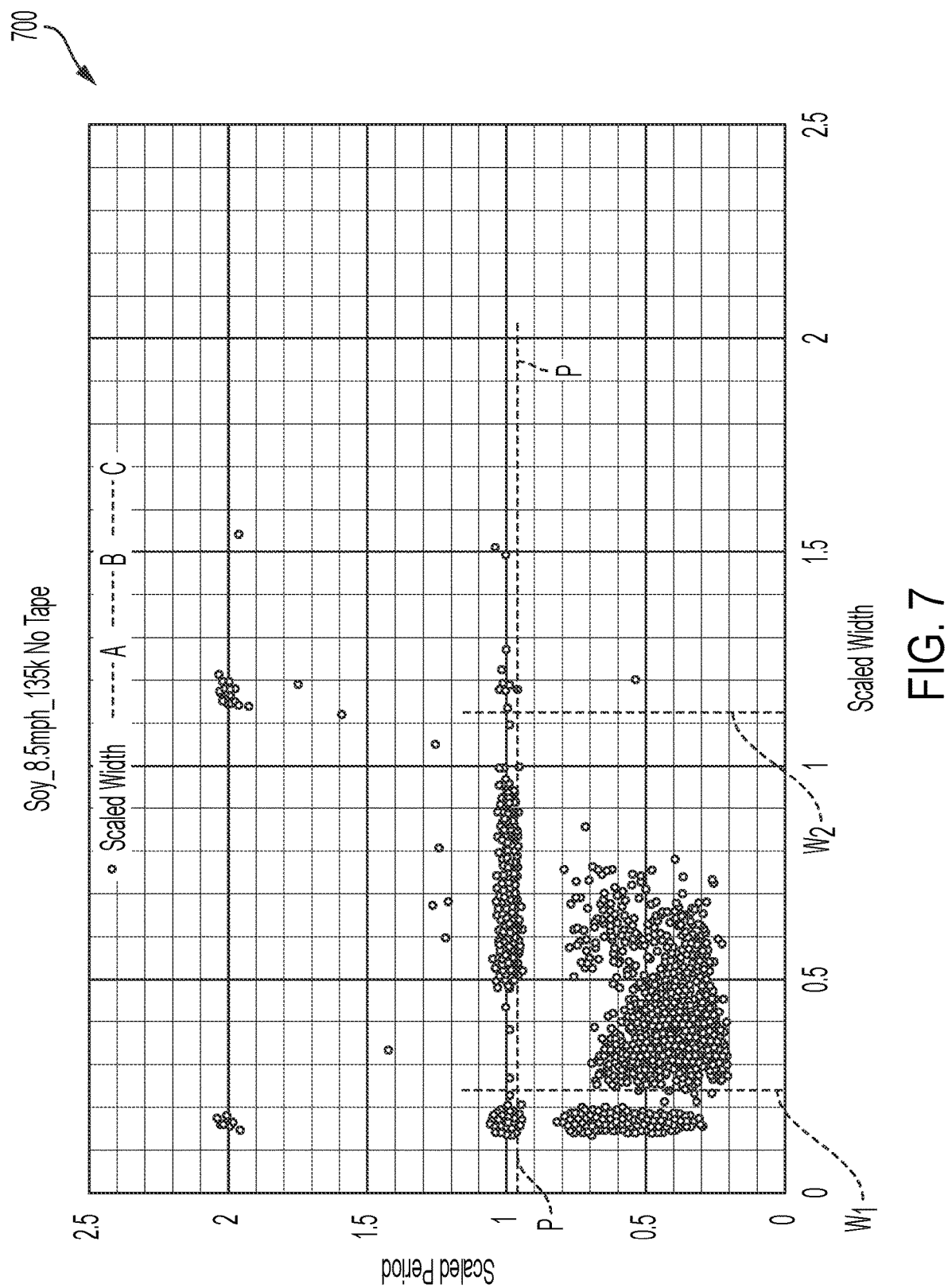
FIG. 7 shows a scatter plot of pulse width to pulse period for the waveform in FIG. 4*a*.

FIG. 7 shows one example of a scatter plot 700 for distinguishing seed pulses 404 and flight pulses 402 in the MPH85 output signal (FIG. 4a), in this instance based on scaled width and scaled period. In scatter plot 700 pulses are plotted based on measured pulse width relative to respective first and second predetermined threshold widths $W_1/W_2$, as well as a threshold period P. The first threshold width $W_1$ is set to a value that is predetermined to correspond to a maximum width expected of pulses generated by belt flights 212 passing though the optic path of the sensor 300; and the second threshold width $W_2$ is set to a value that is predetermined to correspond to a maximum width expected of pulses generated by a single seed 10 passing through the optic path. The threshold period P is set to a value that is predetermined to correspond to the minimum period expected for flights 212 to pass through the optic path. In the scatter plot 700 example, the first threshold width $W_1$ is set to approximately 0.23 and the second threshold width $W_2$ is set to approximately 1.13; with the threshold period P set to approximately 0.96.

Based on the threshold widths $W_1/W_2$, initial determinations can be made that pulses having a width less than the first threshold width $W_1$ represent flight pulses 402; that pulses having a width between the first and second threshold widths $W_1$ and $W_2$ represent single seed pulses 404; and that pulses having a width greater than the second threshold width $W_2$ represent pulses generated from multiple seeds (two, three, or more) concurrently obstructing the optic path (i.e., multi-seed pulses). Initial determinations may also be made that pulses having a period less than the threshold period P are attributable to spatially isolated obstructions in the optic path (e.g., an isolated flight 212, an isolated seed 10, or an isolated collection of multiple seeds 10); whereas pulses having a period greater than the threshold period P are attributable to the combination of a flight 212 and one or more seeds 10 concurrently obstructing the optic path—such as when one or more seeds 10 are resting against a belt flight 212.

So as to facilitate accurate monitoring and counting of seeds dispensed, it is desirable that the measured pulse widths most accurately reflect the actual widths of the dispensed seeds. However, for pulses having a period greater than the threshold period P, it is presumed that the measured pulse width is inclusive of a bias error corresponding to a width of a belt flight 212 against which one or more seeds 10 is resting. Therefore, for pulses having a period greater than the threshold period P, a bias adjustment is made to reduce the measured width by an amount corresponding to a predetermined average flight width so as to yield an adjusted width measurement.

Figure 8:
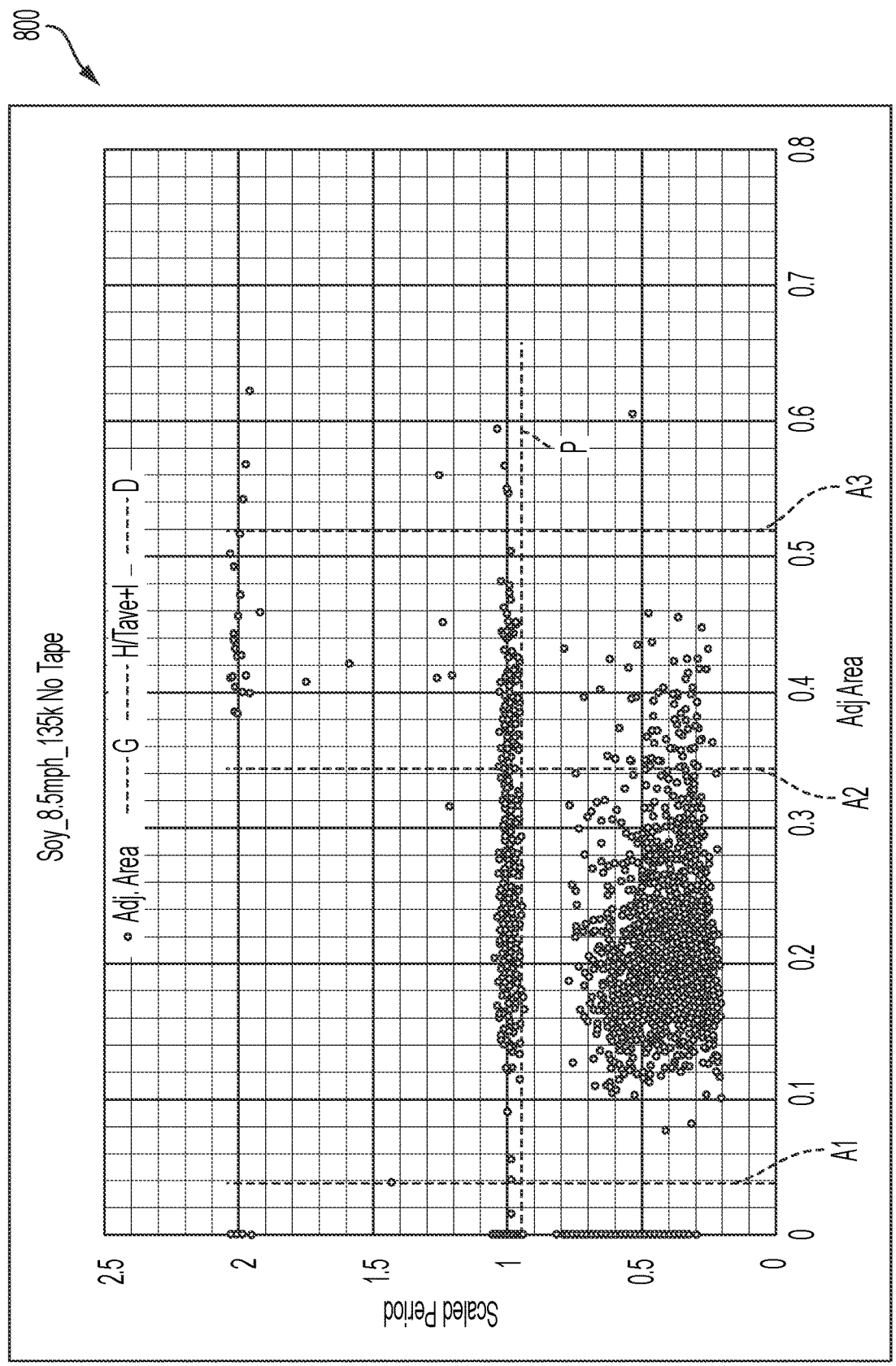
FIG. 8 shows a scatter plot of pulse area to pulse period for the waveform in FIG. 4*a*.

Flight pulses 402 and seed pulses 404 may also be distinguished through a scatter plot 800 based on adjusted pulse area and scaled pulse period, as shown in the example of FIG. 8, which is again based on the MPH85 output signal (FIG. 4a). Adjusted pulse area is the scaled pulse area that has been corrected for the bias error corresponding to the area of a belt flight 212 against which one or more seeds 10 is resting. In scatter plot 800 pulses are plotted based on measured pulse area relative to respective first, second, and third predetermined threshold areas $A_1/A_2/A_3$, as well as a threshold period P. The first threshold area $A_1$ is set to a value that is predetermined to correspond to a maximum area expected of a pulse generated by belt flights 212 passing though the optic path of the sensor 300; the second threshold area $A_2$ is set to a value that is predetermined to correspond to a maximum area expected of a pulse generated by single seeds 10 passing through the optic path; and the third threshold area $A_3$ is set to a value that is predetermined to correspond to a maximum area expected of a pulse generated by two side-by-side seeds 10 passing through the optic path. In scatter plot 800, the first, second, and third threshold areas $A_1/A_2/A_3$ are set to approximately 0.04; 0.34 and 0.52, respectively; and the threshold period P is again set to approximately 0.96. Selection of the area thresholds is made through parameter optimization based on system travelling speed and seed population target.

Based on the threshold areas $A_1/A_2/A_3$, initial determinations can be made that pulses having an area less than the first threshold area $A_1$ represent flight pulses 402; that pulses having an area between the first and second threshold areas $A_1/A_2$ represent single seed pulses 404; that pulses having an area between the second and third threshold areas $A_2/A_3$ represent double seed pulses (i.e., pulses generated from two closely positioned seeds); and that pulses having an area greater than the third threshold area $A_3$ represent pulses generated from three or more seeds concurrently obstructing the optic path (i.e., triple-plus seed pulses). Pulses identified as triple-plus seed pulses are counted as triple seeds regardless of the number of seeds present. The threshold period P again allows for initial determinations that pulses having a period less than the threshold period P are attributable to spatially isolated obstructions in the optic path; whereas pulses having a period greater than the threshold period P are attributable to the combination of a flight 212 and one or more seeds 10 concurrently obstructing the optic path.

Similar to the pulse width measurements, it presumed that pulses having a period greater than the threshold period P will have a measured pulse area that is inclusive of a bias error corresponding to the area of a belt flight 212 against which one or more seeds is resting. Therefore, for pulses having a period greater than the threshold period P a bias adjustment is made to reduce the measured area by an amount corresponding to a predetermined average flight area so as to yield an adjusted area measurement.

Seed counting may be accomplished by computing the adjusted width and/or area for each seed pulse, and then applying the corresponding thresholds, such as those used in scatter plot 700 for width measurements and/or those in scatter plot 800 for area measurements, to determine the number of seeds in each pulse, which is then reported by toggling a seed output pin an appropriate number of times.

Ideally, width and area thresholds for distinguishing between flights, seeds and multiple seeds will be the same for all seeding operations, regardless of seed type, travelling speed, and seed population. However, the thresholds may vary when necessitated by the parameters of a particular seeding operation. For example, if using a seed type having an unconventional seed size changes may then need to be made to one or more threshold values to account for either a smaller or larger seed width and/or area. Preferably, any shift to the threshold values will be based on values determined from one or more histograms that account for variations in a population of the given seed type. By enabling such adjustments to the threshold values, the system is thus made adaptive for effecting improved counting accuracy, regardless of the type of seed used in any given seeding operation.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

The present invention is not limited to the exemplary embodiments illustrated herein, but is instead characterized by the appended claims.

What is claimed is:

1. A system for monitoring the dispensing of seeds, comprising:
   a photoelectric sensor comprising a light-emitting element and a light-responsive element for detecting changes in light flow through an optical path between the light-emitting element and the light-responsive element, and for outputting a signal conveying detected changes in the light flow; and
   signal conditioning circuitry adapted to condition the output signal of the photoelectric sensor to generate a pulse signal waveform with a stable baseline in which pulses generated from the passage of conveyor flights through the optical path of the photoelectric sensor are maintained with substantially uniform amplitude to serve as signal references for the determination of signal characteristics of pulses generated from the passage of one or more seeds through the optical path of the photoelectric sensor.

2. The system according to claim 1, wherein
   the signal conditioning circuitry comprises at least one of a proportional-integral control loop and a gain control loop for controlling an intensity of the light-emitting element of the photoelectric sensor for maintaining pulses generated from the passage of a conveyor flight within the first predetermined intensity range, and further comprises a peak detector control loop for maintaining a stable pulse baseline.

3. A seed dispensing system comprising:
   a seed dispenser comprising a passage for the conveyance of seeds, and a conveyor comprising an endless belt having a plurality of flights therealong for capturing and conveying seeds through the passage; and
   a system for monitoring the dispensing of seeds according to claim 1.

4. The system according to claim 1, further comprising
   a computing device adapted to receive and process pulse signal waveforms from the signal conditioning circuitry to measure one or more parameters of the pulse signal waveform, and to distinguish portions of the pulse signal waveform based on the one or more measured parameters of the signal waveform.

5. The system according to claim 4, wherein
   the computing device is adapted to measure, as the one or more parameters, at least one of: a pulse peak; a pulse period; a pulse width; and a pulse area.

6. The system according to claim 4, wherein
   the computing device is adapted to distinguish between pulses generated from the passage of one or more seeds through the optical path of the photoelectric sensor and pulses generated from the passage of conveyor flights through the optical path of the photoelectric sensor.

7. The system according to claim 4, wherein
   the computing device is adapted to distinguish between pulses generated from the passage of a single seed through the optical path of the photoelectric sensor and pulses generated from the concurrent passage of multiple seeds through the path of optical path of the photoelectric sensor.

8. The system according to claim 5, wherein
   the signal conditioning circuitry comprises at least one of a proportional-integral control loop and a gain control loop for controlling an intensity of the light-emitting element of the photoelectric sensor for maintaining pulses generated from the passage of a conveyor flight within the first predetermined intensity range, and further comprises a peak detector control loop for maintaining a stable pulse baseline.

9. The system according to claim 5, wherein
   the computing device is adapted to distinguish between pulses generated from the passage of a single seed through the optical path of the photoelectric sensor and pulses generated from the concurrent passage of multiple seeds through the optical path of the photoelectric sensor.

10. The system according to claim 7, wherein
    the computing device is adapted to determine at least one of a pulse width and a pulse area of pulses in the pulse signal waveform, and to distinguish pulses generated from the passage of one or more seeds through the optical path of the photoelectric sensor from pulses generated by the passage of conveyor flights through the optical path of the photoelectric sensor based on one or more predetermined threshold values for pulse width and/or pulse area.

11. The system according to claim 9, wherein
    the computing device is adapted to determine at least one of a pulse width and a pulse area of pulses in the pulse signal waveform, and to distinguish pulses generated from the passage of one or more seeds through the optical path of the photoelectric sensor from pulses generated by the passage of conveyor flights through the optical path of the photoelectric sensor based on one or more predetermined threshold values for pulse width and/or pulse area.

12. The system according to claim 10, wherein
    the computing device is adapted to determine a period of pulses in the signal waveform, and to identify pulses having a period exceeding a predetermined period threshold as a compound pulse attributable to the concurrent passage of a conveyor flight and one or more seeds through the optical path of the photoelectric sensor, and to then adjust one or more measured parameters of identified compound pulses to remove a bias error attributable to the conveyor flight.

13. The system according to claim 11, wherein
    the computing device is adapted to determine a period of pulses in the signal waveform, and to identify pulses having a period exceeding a predetermined period threshold as a compound pulse attributable to the concurrent passage of a conveyor flight and one or more seeds through the optical path of the photoelectric sensor, and to then adjust one or more measured parameters of identified compound pulses to remove a bias error attributable to the conveyor flight.

* * * * *